(12) United States Patent
Sonoda

(10) Patent No.: US 8,751,503 B2
(45) Date of Patent: Jun. 10, 2014

(54) COMPUTER PRODUCT, OPERATION AND MANAGEMENT SUPPORT APPARATUS AND METHOD

(75) Inventor: Masataka Sonoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 407 days.

(21) Appl. No.: 13/114,357

(22) Filed: May 24, 2011

(65) Prior Publication Data

US 2011/0225160 A1   Sep. 15, 2011

Related U.S. Application Data

(63) Continuation of application No. PCT/JP2008/072140, filed on Dec. 5, 2008.

(51) Int. Cl.
*G06F 17/30* (2006.01)

(52) U.S. Cl.
USPC .......................................................... 707/739

(58) Field of Classification Search
None
See application file for complete search history.

(56) References Cited

U.S. PATENT DOCUMENTS

| | | | |
|---|---|---|---|
| 6,891,542 B2 * | 5/2005 | Yoshida et al. | 345/530 |
| 6,968,533 B1 * | 11/2005 | Ueda et al. | 717/100 |
| 7,475,073 B2 * | 1/2009 | Leymann et al. | 707/999.01 |
| 8,245,183 B2 * | 8/2012 | Iborra et al. | 717/104 |
| 8,321,362 B2 * | 11/2012 | Carrizo et al. | 706/45 |
| 2007/0143285 A1 * | 6/2007 | Drumm et al. | 707/5 |
| 2007/0150495 A1 * | 6/2007 | Koizumi et al. | 707/100 |
| 2007/0192759 A1 * | 8/2007 | Ishii et al. | 717/113 |
| 2008/0301626 A1 * | 12/2008 | Sivaram | 717/104 |
| 2009/0276415 A1 * | 11/2009 | Dane | 707/5 |

FOREIGN PATENT DOCUMENTS

| | | |
|---|---|---|
| JP | 2000-222197 | 8/2000 |
| JP | 2001-125783 | 5/2001 |
| JP | 2001-273313 | 10/2001 |
| JP | 2007-011463 | 1/2007 |
| JP | 2007-219649 | 8/2007 |

OTHER PUBLICATIONS

Notice of Rejection issued in corresponding Japanese App. No. 2010-541176, mailed Jan. 8, 2013.
English translation of the International Preliminary Report on Patentability for corresponding International Application No. PCT/JP2008/072140 mailed Jun. 16, 2011.
International Preliminary Report on Patentability for corresponding International Application No. PCT/JP2008/072140 mailed Jun. 16, 2011.

* cited by examiner

*Primary Examiner* — Neveen Abel Jalil
*Assistant Examiner* — Jacques Veillard
(74) *Attorney, Agent, or Firm* — Greer Burns & Crain Ltd.

(57) ABSTRACT

A computer-readable, non-transitory medium stores therein an operation management support program that causes a computer to execute a process that includes acquiring execution history information recording for each element group included in activity diagrams expressing work procedures for operation processes executed by a system, correlations between elements and access destinations thereof; searching among elements not yet selected from among all element groups, for a second element having an access destination coinciding with that of a first element selected from among all element groups, the searching performed by referring to the acquired execution history information; setting the first and the second elements as synonymous elements, if a second element is retrieved at the searching; extracting from among the element groups included in the activity diagrams including synonymous elements, a common element string of elements common among the activity diagrams that include the synonymous elements; and outputting the extracted common element string.

9 Claims, 15 Drawing Sheets

| ID | TYPE | PROPERTY | SET VALUE |
|---|---|---|---|
| C11 | SERVER | IP ADDRESS | 192.168.0.4 |
| | | NAME | Web SERVER 3 |
| | | CPU CLOCK FREQUENCY | 1.5GHz |
| | | DISK CAPACITY | 150GB |
| | | MODEL NUMBER | XYZ |
| | | LOAD AVERAGE | 3.0 |
| | | AVERAGE CPU UTILIZATION | 63% |

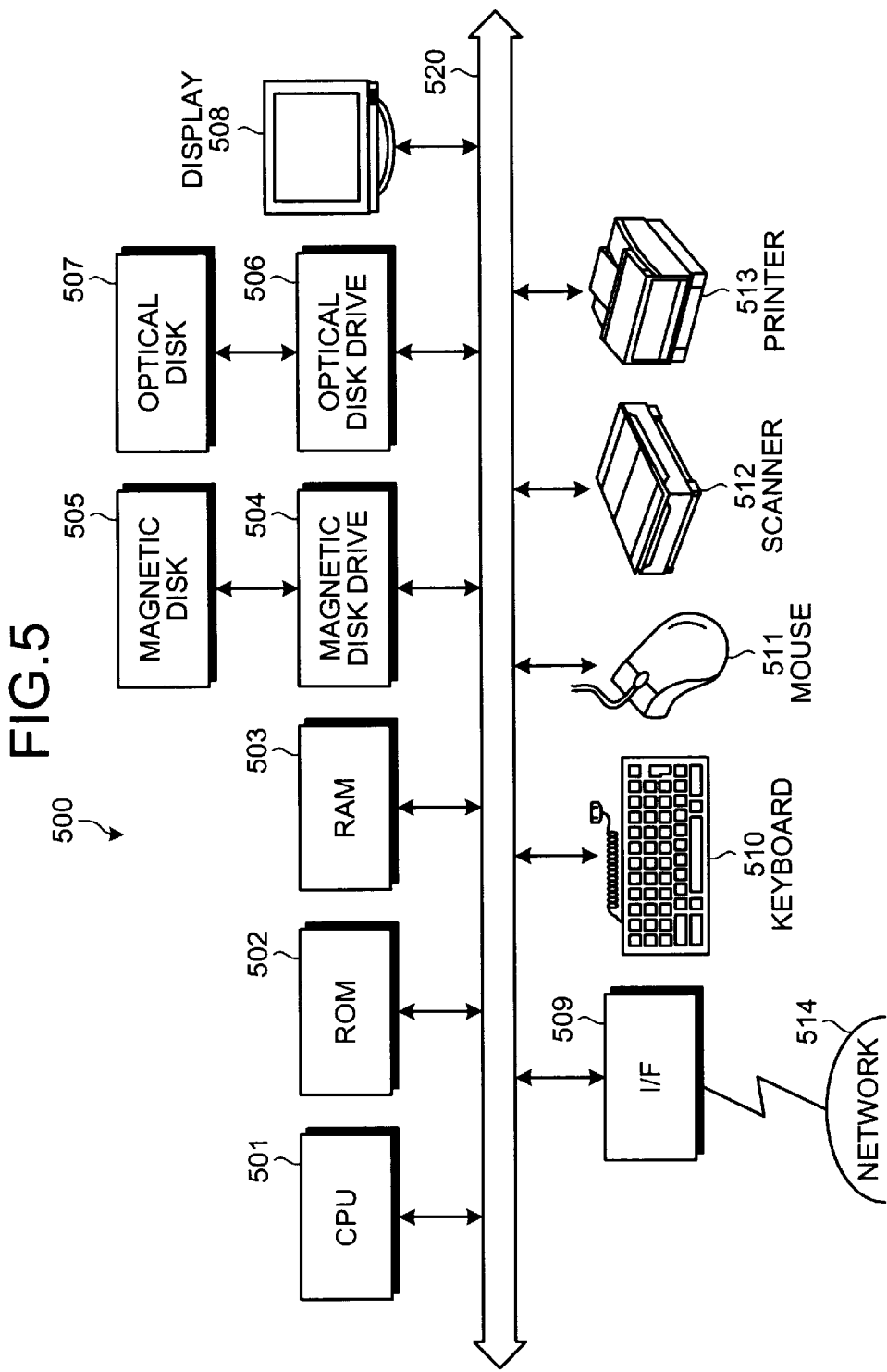

FIG.6

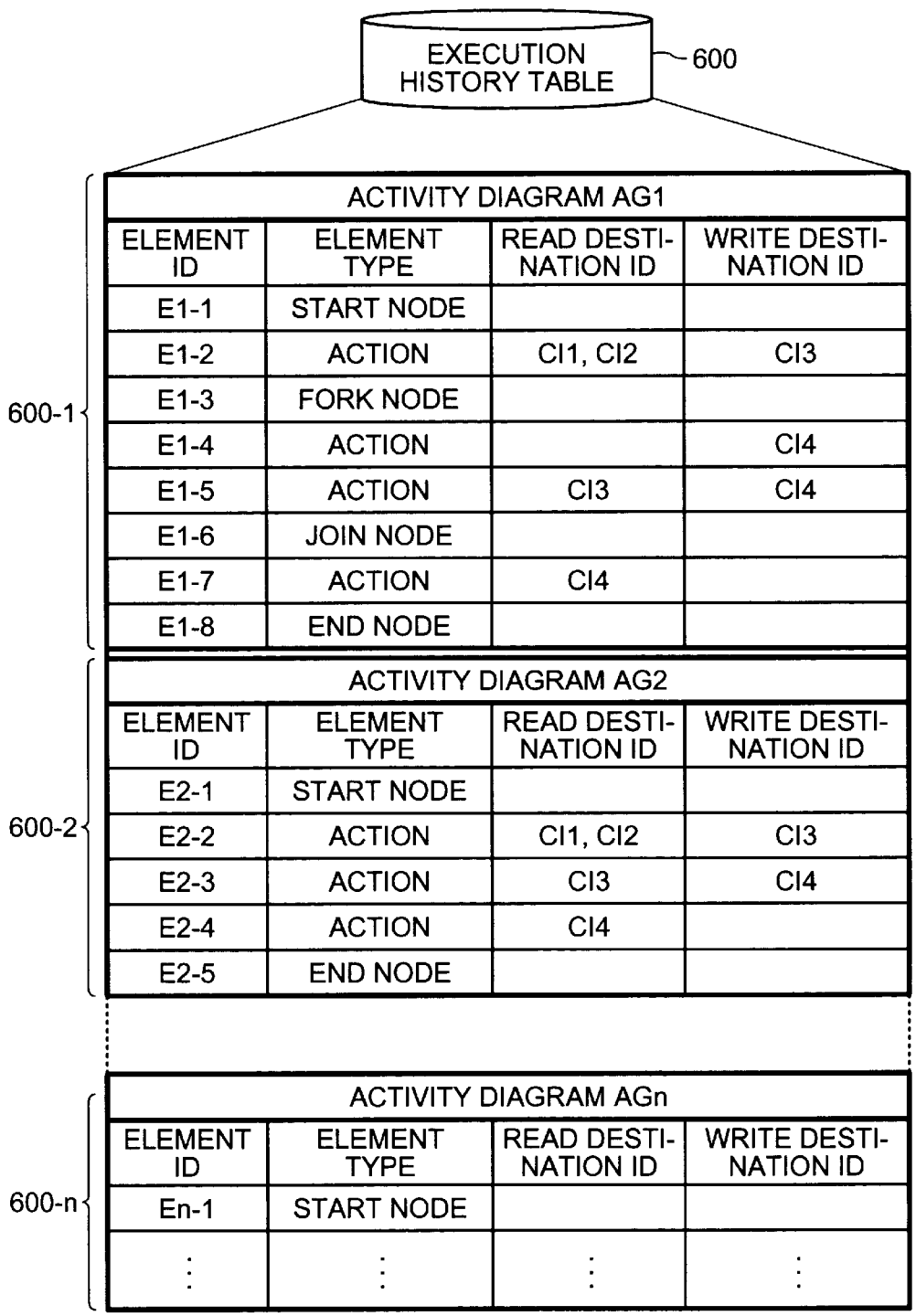

EXECUTION HISTORY TABLE — 600

ACTIVITY DIAGRAM AG1 (600-1)

| ELEMENT ID | ELEMENT TYPE | READ DESTI-NATION ID | WRITE DESTI-NATION ID |
|---|---|---|---|
| E1-1 | START NODE | | |
| E1-2 | ACTION | CI1, CI2 | CI3 |
| E1-3 | FORK NODE | | |
| E1-4 | ACTION | | CI4 |
| E1-5 | ACTION | CI3 | CI4 |
| E1-6 | JOIN NODE | | |
| E1-7 | ACTION | CI4 | |
| E1-8 | END NODE | | |

ACTIVITY DIAGRAM AG2 (600-2)

| ELEMENT ID | ELEMENT TYPE | READ DESTI-NATION ID | WRITE DESTI-NATION ID |
|---|---|---|---|
| E2-1 | START NODE | | |
| E2-2 | ACTION | CI1, CI2 | CI3 |
| E2-3 | ACTION | CI3 | CI4 |
| E2-4 | ACTION | CI4 | |
| E2-5 | END NODE | | |

ACTIVITY DIAGRAM AGn (600-n)

| ELEMENT ID | ELEMENT TYPE | READ DESTI-NATION ID | WRITE DESTI-NATION ID |
|---|---|---|---|
| En-1 | START NODE | | |
| ⋮ | ⋮ | ⋮ | ⋮ |

FIG.8 800

| ACTION ID | READ DESTINATION ID | WRITE DESTINATION ID | CLASSIFICATION-COMPLETED FLAG |
|---|---|---|---|
| E1-2 | Cl1, Cl2 | Cl3 | NO |
| E1-4 | | Cl4 | NO |
| E1-5 | Cl3 | Cl4 | NO |
| E1-7 | Cl4 | | NO |
| E2-2 | Cl1, Cl2 | Cl3 | NO |
| E2-3 | Cl3 | Cl4 | NO |
| E2-4 | Cl4 | | NO |
| ... | ... | ... | ... |

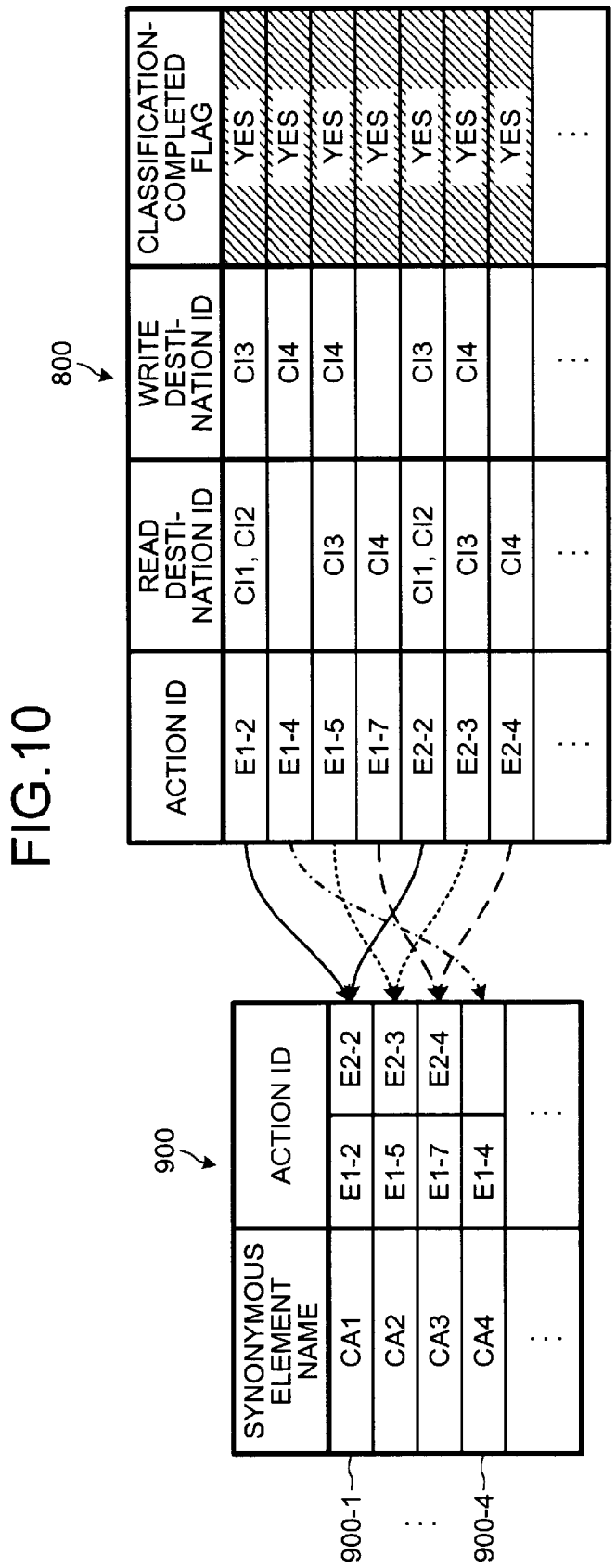

FIG.11

600-1

| ACTIVITY A1 |||||
|---|---|---|---|---|
| SYNONYMOUS ELEMENT NAME | ELEMENT ID | ELEMENT TYPE | READ DESTI- NATION ID | WRITE DESTI- NATION ID |
| Initial | E1-1 | START NODE | | |
| CA1 | E1-2 | ACTION | CI1, CI2 | CI3 |
| Fork | E1-3 | FORK NODE | | |
| CA4 | E1-4 | ACTION | | CI4 |
| CA2 | E1-5 | ACTION | CI3 | CI4 |
| Join | E1-6 | JOIN NODE | | |
| CA3 | E1-7 | ACTION | CI4 | |
| AFN | E1-8 | END NODE | | |

FIG.12

600-2

| ACTIVITY A2 |||||
|---|---|---|---|---|
| SYNONYMOUS ELEMENT NAME | ELEMENT ID | ELEMENT TYPE | READ DESTI- NATION ID | WRITE DESTI- NATION ID |
| Initial | E2-1 | START NODE | | |
| CA1 | E2-2 | ACTION | CI1, CI2 | CI3 |
| CA2 | E2-3 | ACTION | CI3 | CI4 |
| CA3 | E2-4 | ACTION | CI4 | |
| AFN | E2-5 | END NODE | | |

FIG.13

| ELEMENT STRING ID | ELEMENT STRING |
|---|---|
| L1 | Initial → CA1 → Fork ⟨CA4 / CA2⟩ Join → CA3 → AFN |
| L2 | Initial → CA1 → CA2 → CA3 → AFN |
| L3 | Initial → CA1 → Fork ⟨CA4 / CA2⟩ Join → CA3 → AFN |
| L4 | Initial → CA1 → Fork ⟨CA4 / CA2⟩ Join → CA3 → AFN |
| L5 | Initial → CA1 → CA4 → CA3 → AFN |
| ... | ... |
| Lm | |

1300

COMPUTER PRODUCT, OPERATION AND MANAGEMENT SUPPORT APPARATUS AND METHOD

CROSS REFERENCE TO RELATED APPLICATIONS

This application is a continuation application of International Application PCT/JP2008/072140, filed Dec. 5, 2008, and designating the U.S., the entire contents of which are incorporated herein by reference.

FIELD

The embodiment discussed herein is related to operation management support of information technology (IT) systems.

BACKGROUND

Recently, with the increased scale and complexity of IT systems, specialized knowledge is necessary for operation management of the systems. Operation management is also referred to as "operation process" and is performed for each operation management work type of the system under operation management.

At each operation process, an activity diagram is created expressing the work procedure of the operation process. However, to create an activity diagram for each operation process, from scratch each time consumes time. Further, if the drafter has minimal operation management experience, there is a high possibility that an unsuitable activity diagram will be created.

Consequently, there is a method of providing a work procedure that is performed frequently in an operation process as a template. According to this method, when an activity diagram is newly created, frequently performed work procedures can be used as templates, enabling improved work efficiency in creating the activity diagram and improved quality.

Methods of providing templates are categorized, for example, as types that provide basic activity diagrams that are based on best practice of operation management work such as IT Infrastructure Library (ITIL) and, types that compare different activity diagrams and provide the portions that are similar.

With the types that provide the portions that are similar, the more activity diagrams that are compared, the higher the possibility is that a template having high commonality will be extracted. However, to compare different activity diagrams, description methods and terms must be standardized among the activity diagrams.

Conventionally, technology has been proposed whereby, process knowledge becomes exploitable beyond field and region by commonly describing and categorizing various processes that exist in the real world (see, for example, Japanese Laid-Open Patent Publication No. 2001-273313). Such technology enables description methods for activity diagrams to be integrated among different operation processes.

Nonetheless, with the conventional technology recited in Japanese Laid-Open Patent Publication No. 2001-273313, no reference is made with respect to attribute information (e.g., element name) of elements constituting the activity diagrams. Consequently, a problem arises in that only relations of element names and processing details in the same operation process are integrated and the extraction of a template from among activity diagrams of different operation processes is difficult.

For example, when a template is extracted, not only is flow configuration (connection of elements) of the activity diagrams judged, but also the processing details of each action are judged. In other words, if the processing details are different, similarity will not be determined even if the flow configuration is identical. Whether processing details among elements are the same is often determined by attribute information such as element name.

Therefore, to extract a template, if the element names between compared activity diagrams do not coincide, determining whether processing details coincide is difficult. As a result, template extraction work becomes difficult and just as before, invites the problem of increased workload and time consumed for activity diagram generation.

SUMMARY

According to an aspect of an embodiment, a computer-readable, non-transitory medium stores therein an operation management support program that causes a computer to execute a process. The process includes acquiring execution history information recording for each element group included in activity diagrams expressing work procedures for operation processes executed by a system under operation management, correlations between elements and access destinations of the elements; searching among a group of unselected elements that have yet to be selected from among all of the element groups, for a second element having an access destination coinciding with that of a first element selected from among all of the element groups, the searching performed by referring to the acquired execution history information; setting the first and the second elements as synonymous elements, if a second element is retrieved at the searching; extracting from among the element groups included in the activity diagrams that include the synonymous elements, a common element string of the elements common among the activity diagrams that include the synonymous elements; and outputting the extracted common element string.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 depicts an example of a data structure of a CI.

FIG. 5 is a block diagram of a hardware configuration of an operation management support apparatus according to the embodiment.

FIG. 6 depicts an example of the contents of an execution history table.

FIG. 8 depicts an example of the contents of an action list.

FIGS. 9 and 10 depict examples of the contents of a classification-completed list.

FIG. 11 depicts an example of execution history data 600-1 to which attribute information (synonymous element name) has been assigned.

FIG. 12 depicts an example of execution history data 600-2 to which attribute information (synonymous element name) has been assigned.

FIG. 13 depicts an example of an element string list.

DESCRIPTION OF EMBODIMENTS

Preferred embodiments of the present invention will be explained with reference to the accompanying drawings. In the embodiments, process groups of each operation process and having the same access destinations are classified to be synonymous, and processing of different names are standardized, whereby common portions among different operation processes can be extracted as a form, improving the efficiency of generating new operation processes.

Figure 1:
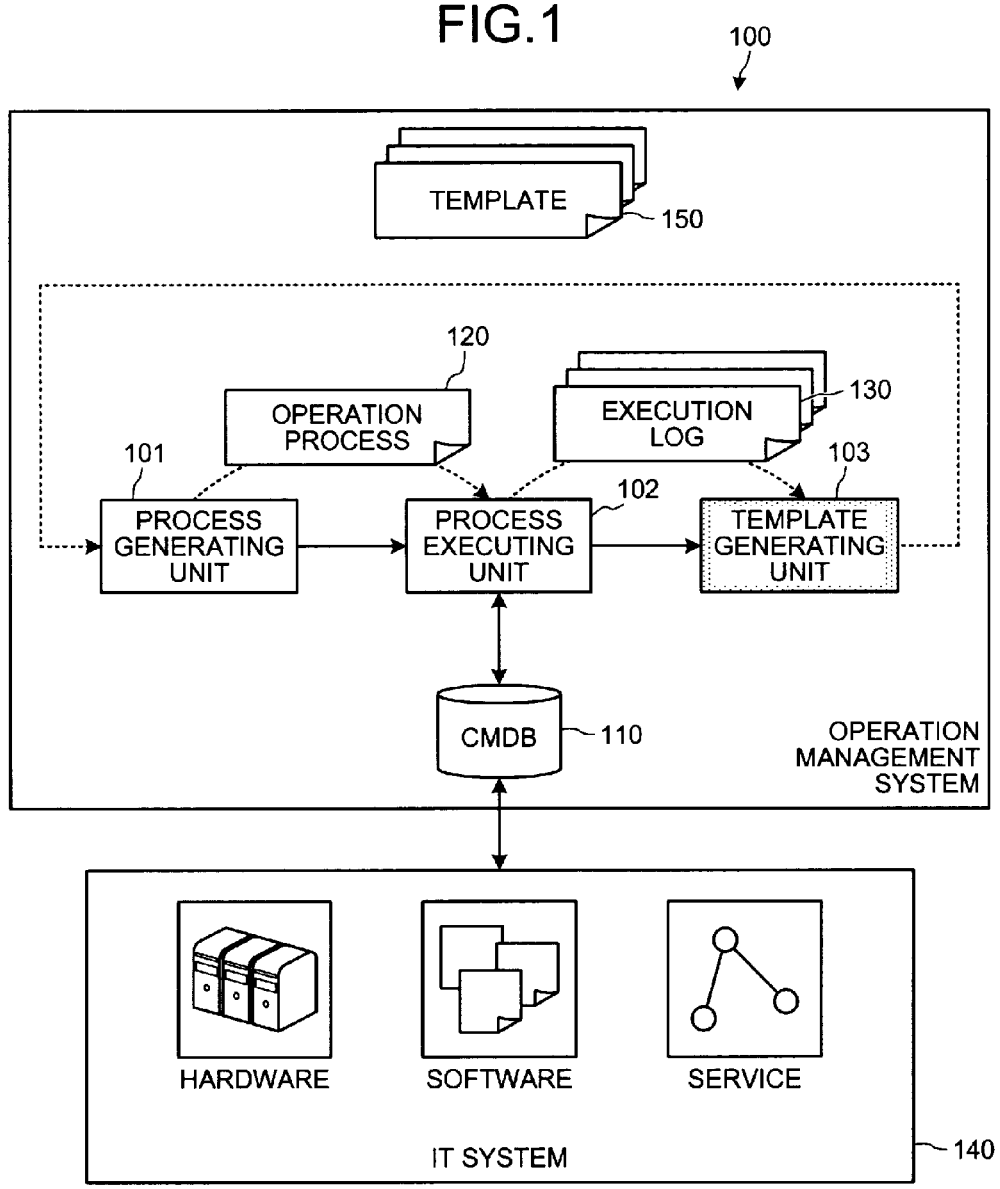
FIG. 1 depicts a system configuration of an operation management system.

FIG. 1 depicts a system configuration of an operation management system. As depicted in FIG. 1, an operation management system 100 includes a configuration management database (CMDB) 110 and is further configured by a process generating unit 101, a process executing unit 102, and a template generating unit 103.

The operation management system 100 manages an IT system 140. The CMDB 110 is a database managing configuration elements of the IT system 140, as configuration items (CI). Here, a configuration element is, for example, a hardware or software physical resource, virtual resource, and service operating on the IT system 140.

The process generating unit 101 has a function of generating an operation process 120 of the IT system 140 under management. For example, the process generating unit 101 generates an activity diagram depicting the work procedure of the operation process 120. The activity diagram is described in detail with reference to FIG. 3.

The process executing unit 102 has a function of executing an activity according to the activity diagram depicting the work procedure for the operation process 120. Here, an activity is a series of tasks starting from a start state, where actions are successively executed (operation state) until an end state. The process executing unit 102 accesses a CI of the CMDB 110 and refers to a set value related to the IT system 140. The structure of a CI is described in detail with reference to FIG. 2. Further, if the set value has been changed by a user manipulation of the IT system 140, the process executing unit 102 accesses the CI of the CMDB 110 and changes the set value.

The template generating unit 103 has a function of extracting common portions among different operation processes and generating a template 150, based on an execution log 130 of activity execution results. The execution log 130 includes for each element included in the activity diagram, a record indicating the CI's accessed by the element.

Thus, in the operation management system 100, common portions among different operation processes can be extracted and a template 150 generated, whereby the efficiency of generating a new operation process (activity diagram) is improved.

An operation management support apparatus according to the embodiment has the function of at least the template generating unit 103 among the functional units 101 to 103. Functions of the process generating unit 101 and the process executing unit 102 may be included in the operation management support apparatus or may be included in another computer apparatus.

FIG. 2 depicts an example of a data structure of a CI. As depicted in FIG. 2, CI 1 includes a configuration item ID, the type, a property and a set value.

Here, a configuration item ID is an identifier identifying a CI. The type is the kind of CI. The type may be, for example, a server, a switch, storage, etc. A property is an attribute of the CI. An attribute is, for example, an IP address, a name, central processing unit (CPU) clock frequency, disk capacity, a model number, load average, average CPU utilization, etc. A set value is an attribute value set for each property.

The process executing unit 102 depicted in FIG. 1 accesses a CI of the CMDB 110 (e.g., CI 1) and refers to the set value related to the IT system 140, when an activity is executed. Therefore, the CI's accessed by the elements executed in the activity are recorded in the execution log of the activity.

Figure 3:
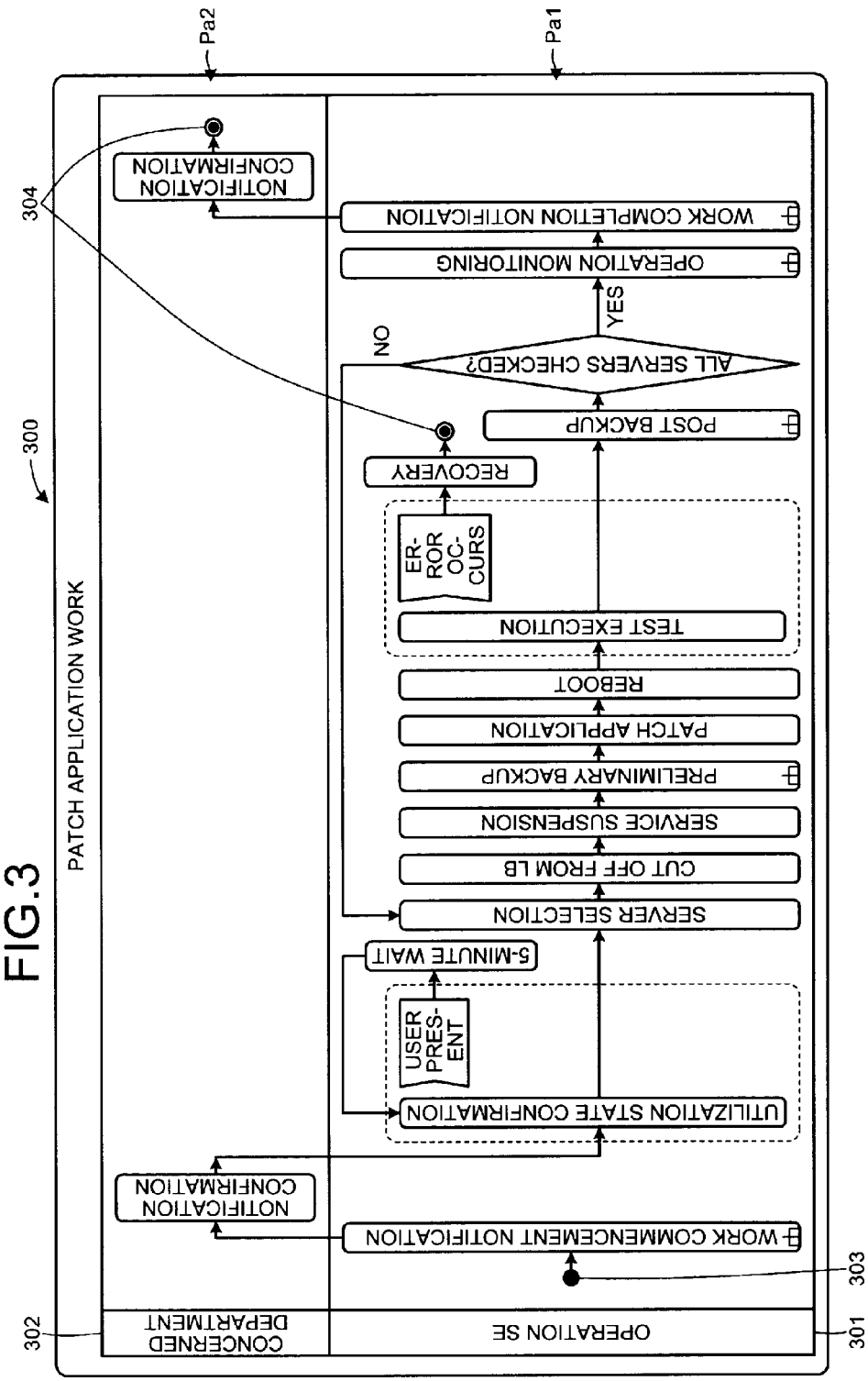
FIG. 3 is an activity diagram expressing a work procedure for patch application work.

The activity diagram expressing the work procedure of the operation process will be described. The activity diagram is described using unified modeling language (UML). FIG. 3 is an activity diagram expressing a work procedure for patch application work. In the example depicted in FIG. 3, the work procedure for patch application work in the IT system 140 is described in an activity diagram 300.

The activity diagram 300 includes 2 parties, an operator of operation SE301 and a concerned department 302. Processing details described in partition Pa1 of the activity diagram 300 describe the work for the operation SE301. The processing details described in partition Pa2 describe the work for the concerned department 302.

In the activity diagram 300, a black circle 303 is a start node and processing (rectangles with rounded corners) is executed as indicated by the arrows until an end node is reached (a white-framed black circle 304), where the activity ends. Each processing described in the activity diagram 300 is an action. For each action, an action name (element name) is described.

An overview of the embodiment will be described. Here, a conventional problem will be described. Conventionally, the method of assigning attribute information (e.g., an element name) to each element (e.g., an action) constituting an activity diagram is not the same among different processes. Therefore, even if actions described in different activity diagrams have the same element name, the actions are not necessarily synonymous.

For example, actions having the same element name of "performance estimate" are assumed to be present in 2 different activity diagrams (P and Q). The action "performance estimate" described in activity diagram P describes "an estimate of network performance". Meanwhile, the action "performance estimate" described in activity diagram Q describes "an estimate of server performance". In this case, the 2 actions having the same element name of "performance estimate" are actions having different processing details.

Further, even if synonymous actions have been executed in different activity diagrams, the actions do not necessarily have the same element name. For example, an action "login to given machine" is present in 2 different activity diagrams (R and S). In the activity diagram (R), this action is described with a name of "login", whereas in the activity diagram (S), this action is described with a name of "server login". In this case, although the actions have the same processing details, since the element names differ, it is likely that the actions will be recognized as different actions.

Therefore, since synonymity is judged conventionally by the element names, which are preliminarily assigned, if the method of assigning element names is not the same among different processes, determining synonymity thereamong is difficult.

In this regard, in the present embodiment, actions included in an activity diagram and having the same access destination are classified to be synonymous. In other words, synonymity between elements is not determined by preliminarily assigned element names, but rather by the access destination of the elements.

Figure 4:
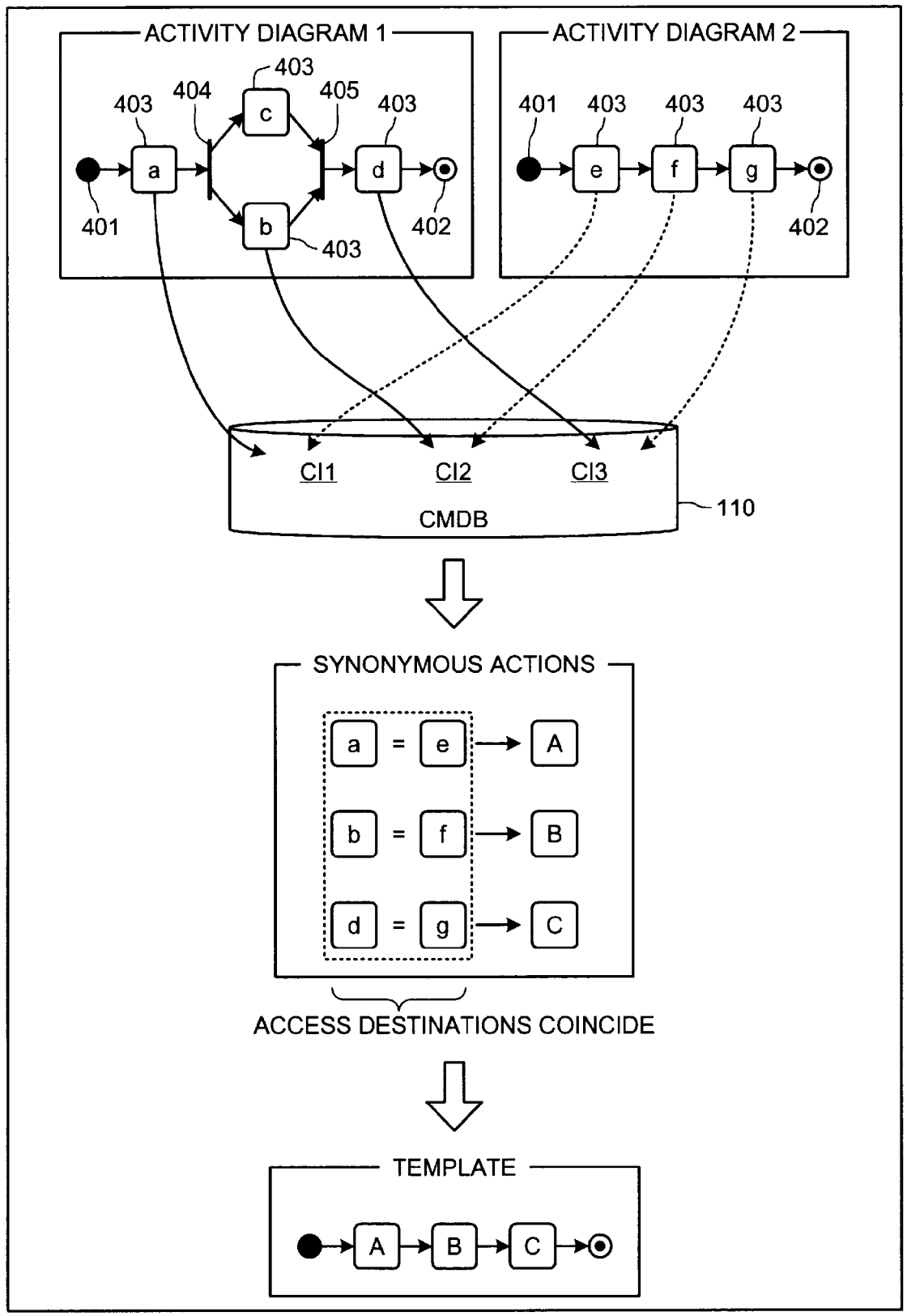
FIG. 4 is a diagram depicting an overview of an embodiment.

FIG. 4 is a diagram depicting an overview of the embodiment. FIG. 4 depicts the activity diagrams 1 and 2 expressing different operation processes. In the activity diagrams 1 and 2, black circles 401 are start nodes, white-framed black circles 402 are end nodes, rounded-corner rectangles 403 are actions, a black line 404 is fork node, and black line 405 is a join node.

The start node is a node representing the start of an activity. The end node is a node representing the end of the activity. An action node is a node representing processing executed in the activity. The fork node is a node representing the start of parallel processing. A join node is a node representing the end of parallel processing.

In the example depicted in FIG. 4, the access destinations "CI 1" of action_a and action_e are the same. Therefore, action_a and action_e are classified as a synonymous action_A. Similarly, action_b and action_f are classified as a synonymous action_B; and action d and action_g are classified as a synonymous action_C. Consequently, the synonymity of elements in different processes, among which the methods of assigning element names are not the same, can be determined.

Thus, in the embodiment, by standardizing the significance (synonymity) given to elements having differing element names (e.g., action names), common portions among different operation processes can be extracted, whereby a template for activity diagram generation can be extracted, facilitating improved efficiency in operation process generation.

FIG. 5 is a block diagram of a hardware configuration of an operation management support apparatus according to the embodiment. As depicted in FIG. 5, the operation management support apparatus includes a central processing unit (CPU) 501, a read-only memory (ROM) 502, a random access memory (RAM) 503, a magnetic disk drive 504, a magnetic disk 505, an optical disk drive 506, an optical disk 507, a display 508, an interface (I/F) 509, a keyboard 510, a mouse 511, a scanner 512, and a printer 513, respectively connected by a bus 520.

The CPU 501 governs overall control of the operation management support apparatus. The ROM 502 stores therein programs such as a boot program. The RAM 503 is used as a work area of the CPU 501. The magnetic disk drive 504, under the control of the CPU 501, controls the reading and writing of data with respect to the magnetic disk 505. The magnetic disk 505 stores therein data written under control of the magnetic disk drive 504.

The optical disk drive 506, under the control of the CPU 501, controls the reading and writing of data with respect to the optical disk 507. The optical disk 507 stores therein data written under control of the optical disk drive 506, the data being read by a computer.

The display 508 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 508.

The I/F 509 is connected to a network 514 such as a local area network (LAN), a wide area network (WAN), and the Internet through a communication line and is connected to other apparatuses through the network 514. The I/F 509 administers an internal interface with the network 514 and controls the input/output of data from/to external apparatuses. For example, a modem or a LAN adaptor may be employed as the I/F 509.

The keyboard 510 includes, for example, keys for inputting letters, numerals, and various instructions and performs the input of data. Alternatively, a touch-panel-type input pad or numeric keypad, etc. may be adopted. The mouse 511 is used to move the cursor, select a region, or move and change the size of windows. A track ball or a joy stick may be adopted provided each respectively has a function similar to a pointing device.

The scanner 512 optically reads an image and takes in the image data into the operation management support apparatus. The scanner 512 may have an optical character reader (OCR) function as well. The printer 513 prints image data and text data. The printer 513 may be, for example, a laser printer or an ink jet printer.

The contents of the execution history table used by the operation management support apparatus 500 will be described. FIG. 6 depicts an example of the contents of the execution history table. In the example depicted in FIG. 6, an execution history table 600 has fields including element ID, element type, read destination ID, and write destination ID. By setting data in each of the fields, execution history data 600-1 to 600-n, respectively corresponding to each activity diagram AG1 to AGn, are stored as records.

Here, an element ID is an identifier identifying an element included in an activity diagram. An element type is an element category, such as start node, end node, action, fork node, join node, etc. A read destination ID and a write destination ID are configuration item ID's respectively identifying the CI's accessed by each element when an activity is executed.

The execution history data 600-1 to 600-n are referenced, whereby the access destination of each element can be recognized. In the execution history data 600-1 to 600-n, the elements are arranged sequentially according to the procedure, from the start node to the end node. The execution history table 600 is stored to a storage area such as the RAM 503, the magnetic disk 505, and the optical disk 507 depicted in FIG. 5.

Figure 7:
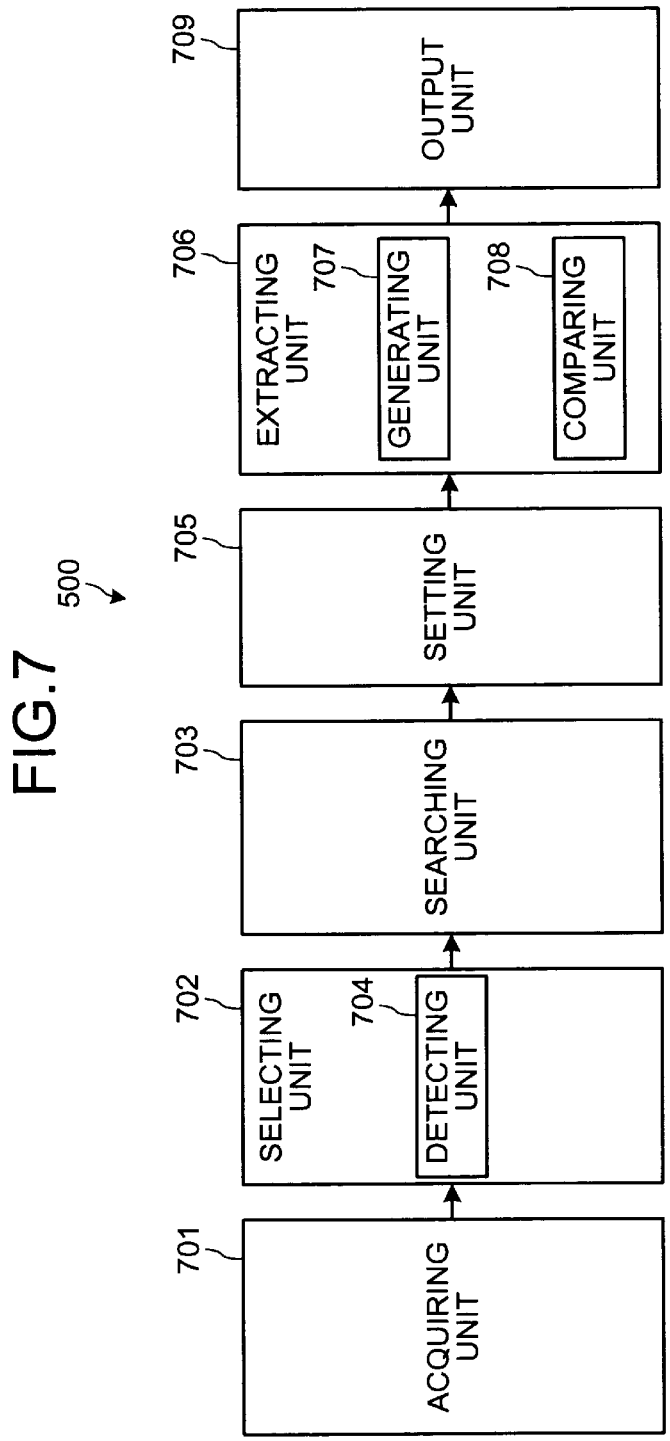
FIG. 7 depicts a functional configuration of the operation management support apparatus.

A functional configuration of the operation management support apparatus 500 will be described. FIG. 7 depicts a functional configuration of the operation management support apparatus. As depicted in FIG. 7, the operation management support apparatus 500 includes an acquiring unit 701, a selecting unit 702, a searching unit 703, a detecting unit 704, a setting unit 705, an extracting unit 706, a generating unit 707, a comparing unit 708, and an output unit 709. The respective functions constituting a control unit (the acquiring unit 701 to the output unit 709), for example, are implemented by executing on the CPU 501, a program stored in a storage area such as the ROM 502, the RAM 503, the magnetic disk 505, and the optical disk 507 or via the I/F 509.

The acquiring unit 701 has a function of acquiring the execution history data 600-1 to 600-n (refer to FIG. 6). Here, the execution history data 600-1 to 600-n is information recording correlations between elements included an activity diagram expressing the work procedure of an operation process executed in an IT system under operation management and the access destinations of each element.

For example, the acquiring unit 701 may receive the execution history data 600-1 to 600-$n$ by user input via the keyboard 510 and/or mouse 511 depicted in FIG. 5. Further, based on the execution log 130 (see FIG. 1) of an activity executed in the IT system 140, the execution history data 600-1 to 600-$n$ may be created. The acquired results are, for example, stored to the execution history table 600 depicted in FIG. 6.

The selecting unit 702 has a function of referring to the execution history data 600-1 to 600-$n$ and selecting a first element from among all of the element groups. All of the element groups mean all of the elements included in the activity diagrams AG1 to AGn. For example, the selecting unit 702 selects the first element by selecting an arbitrary element ID from an element group included in the execution history data 600-1 to 600-$n$.

The searching unit 703 has a function of referring to the execution history data 600-1 to 600-$n$ and searching among unselected elements that have not yet been selected from among all of the element groups, for a second element having an access destination coinciding with that of the first element. For example, the searching unit 703 uses read destination ID's and write destination ID's in the execution history data 600-1 to 600-$n$ as clues to search for a second element having an access destination that coincides with that of the first element.

The searching unit 703, for example, retrieves a second element having a read destination ID and a write destination ID that coincide with those of the first element. Here, if multiple elements are present having a read destination ID and a write destination ID coinciding with those of the first element, all of the elements are retrieved as second elements. The retrieved search results are stored to, for example, a storage area such as the RAM 503, the magnetic disk 505, and the optical disk 507.

Among all of the element groups, elements having access destinations are only elements representing "processing". Elements representing "processing" are elements having an element type of "action". Therefore, the element selected by the selecting unit 702 and the element searched for by the searching unit 703 may be limited to elements having an element type of "action".

In this case, elements having an element type of "action" are narrowed down from among all of the element groups. Here, the detecting unit 704 has a function of detecting an element representing processing, from among an element group included in an activity diagram. For example, the detecting unit 704 uses the element type "action" in the execution history data 600-1 to 600-$n$ as a clue to detect an element the represents processing (hereinafter, "action"). The obtained detection results are stored, for example, to an action list such as that depicted in FIG. 8.

FIG. 8 depicts an example of the contents of an action list. In the example depicted in FIG. 8, an action list 800 has fields including action ID, read destination ID, write destination ID, and classification-completed flag. By setting information in each of the fields, execution histories are stored for each action, as a record.

Here, an action ID is an element ID identifying an action. A read destination ID is a configuration item ID identifying a CI that is read when an action is executed. A write destination ID is a configuration item ID identifying a CI that is written to when an action is executed. Classification-completed flags are flags respectively indicating, for each action, whether classification has been completed. In the initialized state, each flag is set as "NO". The classification-completed flags are described in detail hereinafter.

In this case, the selecting unit 702 refers to the action list 800 and selects a first element from among all of the element groups (all action groups). Further, the searching unit 703 refers to the action list 800 and retrieves from among a group of unselected actions that have not yet been selected from the action groups, a second element having an access destination coinciding with that of the first element.

Here, an example will be described in which an element E1-2 is selected from among all of the action groups, as a first element. In this example, the searching unit 703 retrieves, as a second element, an element E2-2 having read destination ID's "CI 1 and CI2" and a write destination ID "CI3" coinciding with those of the element E1-2. Thus, by narrowing the elements to be selected and searched for to actions alone, meaningless selection processing and search processing with respect to elements having no access destination(s) can be eliminated.

The setting unit 705 has a function of setting the retrieved second element and the first element as synonymous elements. For example, the setting unit 705, by assigning the same attribute information to the first element and the second element, sets the first and the second elements as synonymous elements. The attribute information may be, for example, a synonymous element name, a synonymous element ID, etc. uniquely identifying the synonymous elements.

Consequently, from among all of the element groups included in all of the activity diagrams, a first and a second element having coinciding access destinations can be classified as synonymous elements. The set result is stored to a classification-completed list (refer to FIGS. 9 and 10) described hereinafter.

Figure 9:
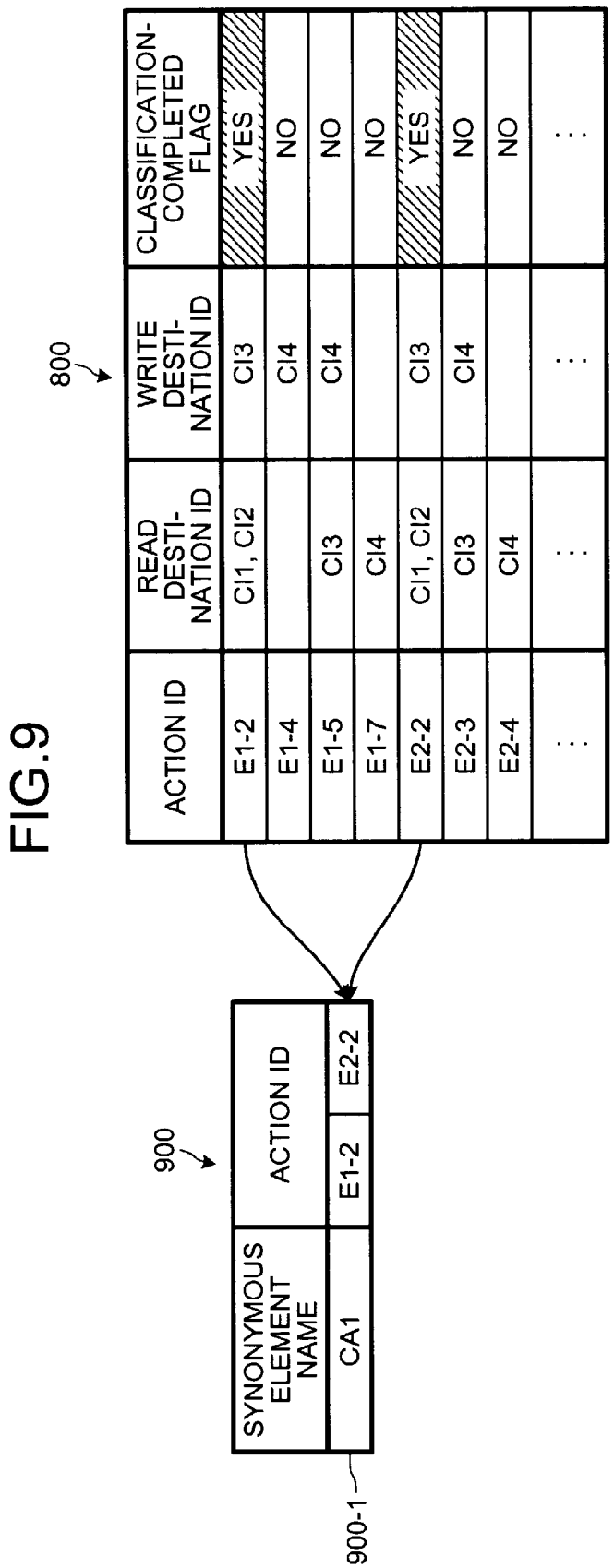

The contents of a classification-completed list will be described. FIGS. 9 and 10 depict examples of the contents of a classification-completed list. A classification-completed list 900 has fields including synonymous element name and action ID, in which information related to classified elements is stored as records.

A synonymous element name is attribute information uniquely identifying synonymous elements. An action ID is the element ID of the first and the second elements set as synonymous elements. Here, each time a first element and a second element are set as synonymous elements, information is set in the respective fields of the classification-completed list 900 to record a new record.

In the example depicted in FIG. 9, the element E1-2 and the element E2-2 are set as synonymous elements and a synonymous element name "CA1" is assigned as attribute information, the results of which (classification information 900-1) are stored as a new record in the classification-completed list 900. Upon the recording to the classification-completed list 900, the classification-completed flag of the concerned action in the action list 800 is rewritten from "NO" to "YES".

In the example depicted in FIG. 10, since all of the actions included in the action list 800 have been classified (selection processing, search processing, and setting processing), the classification-completed flag of each of the actions is "YES". Here, first elements for which a second element having a coinciding access destination was not found, are also assigned the synonymous element name and recorded in the classification-completed list 900 (classification information 900-4).

The reference of description returns to FIG. 7. The extracting unit 706 has a function of extracting from among groups of elements included in activity diagrams that respectively include synonymous elements, a common element string which is a string of elements common between the activity diagrams. For example, the extracting unit 706 compares the element strings of the activity diagrams respectively having synonymous elements to extract a common element string from among the element groups.

Here, an example of details of the extraction processing will be described. The generating unit 707 has a function of generating an element string representing, as synonymous elements, the first and the second elements in the element group included in an activity diagram that includes the first or the second element. For example, the generating unit 707 refers to the classification-completed list 900 and assigns new attribute information to each of the elements in the execution history data 600-1 to 600-*n*.

Here, the execution history data 600-1 and 600-2 are taken as an example. The generating unit 707 refers to the classification-completed list 900 depicted in FIG. 10 and assigns a synonymous element name to the elements corresponding to the action ID's in the execution history data 600-1 to 600-*n*. Further, other elements differing from the action are also assigned a synonymous element name according to element type.

For example, an element of element type "start point" is assigned the synonymous element name "initial". Further, an element of element type "fork" is assigned the synonymous element name "fork"; an element of element type "join" is assigned element name "join"; and an element of element type "end point" is assigned synonymous element name "AFN".

FIGS. 11 and 12 depict examples of execution history information that has been assigned attribute information. FIG. 11 depicts an example of the execution history data 600-1 to which attribute information (synonymous element name) has been assigned. For example, element E1-2 has been assigned the synonymous element name "CA1".

FIG. 12 depicts an example of the execution history data 600-2 to which attribute information (synonymous element name) has been assigned. For example, the element E2-2 has been assigned the synonymous element name "CA1", which is the same synonymous element name assigned to the element E1-2 depicted in FIG. 11. As a result, synonymity between elements of different processes can be determined.

Next, the generating unit 707 refers to the execution history data 600-1 to 600-*n* that has been assigned attribute information and generates element strings for each of the activity diagrams listing synonymous element names (e.g., according to element type (fork node, join node), lists sequentially according to the procedure, each action from a start node to an end node). The generated result is, for example, stored to the element string list depicted in FIG. 13.

FIG. 13 depicts an example of an element string list. As depicted in FIG. 13, an element string list 1300 has fields for element string ID's and element strings, and stores information related to element strings of each activity diagram. Here, an element string ID is an identifier identifying an element string. An element string is an element string listing synonymous element names.

Here, element string L1 is taken as one example. Element string L1 is a string listing the synonymous element names included in the execution history data 600-1 depicted in FIG. 11. Further, element string L2 is a string listing the synonymous element names included in the execution history data 600-2 depicted in FIG. 12. Since the significance give to each of the elements is standardized among element strings L1 to Lm, synonymity among elements and the relation among elements can be compared.

The comparing unit 708 has a function of comparing the element strings that are respectively for each activity diagram. For example, the comparing unit 708 compares the element strings L1 to Lm depicted in FIG. 13, by existing pattern matching. The comparison results obtained are stored to, for example, a storage area such as the RAM 503, the magnetic disk 505, and the optical disk 507.

The extracting unit 706, based on the obtained comparison results and from among the element strings respectively for each of the activity diagrams, extracts a common element string of elements common among a portion of multiple element strings or common to entire element strings. Here, if portions of or entire element strings coincide between a given number (e.g., 3 or more) of element strings, a common element string may be extracted. Further, if a common element string is an element string that includes a given number of elements or more (e.g., 5 or more), the common element string may be extracted.

Figure 14:
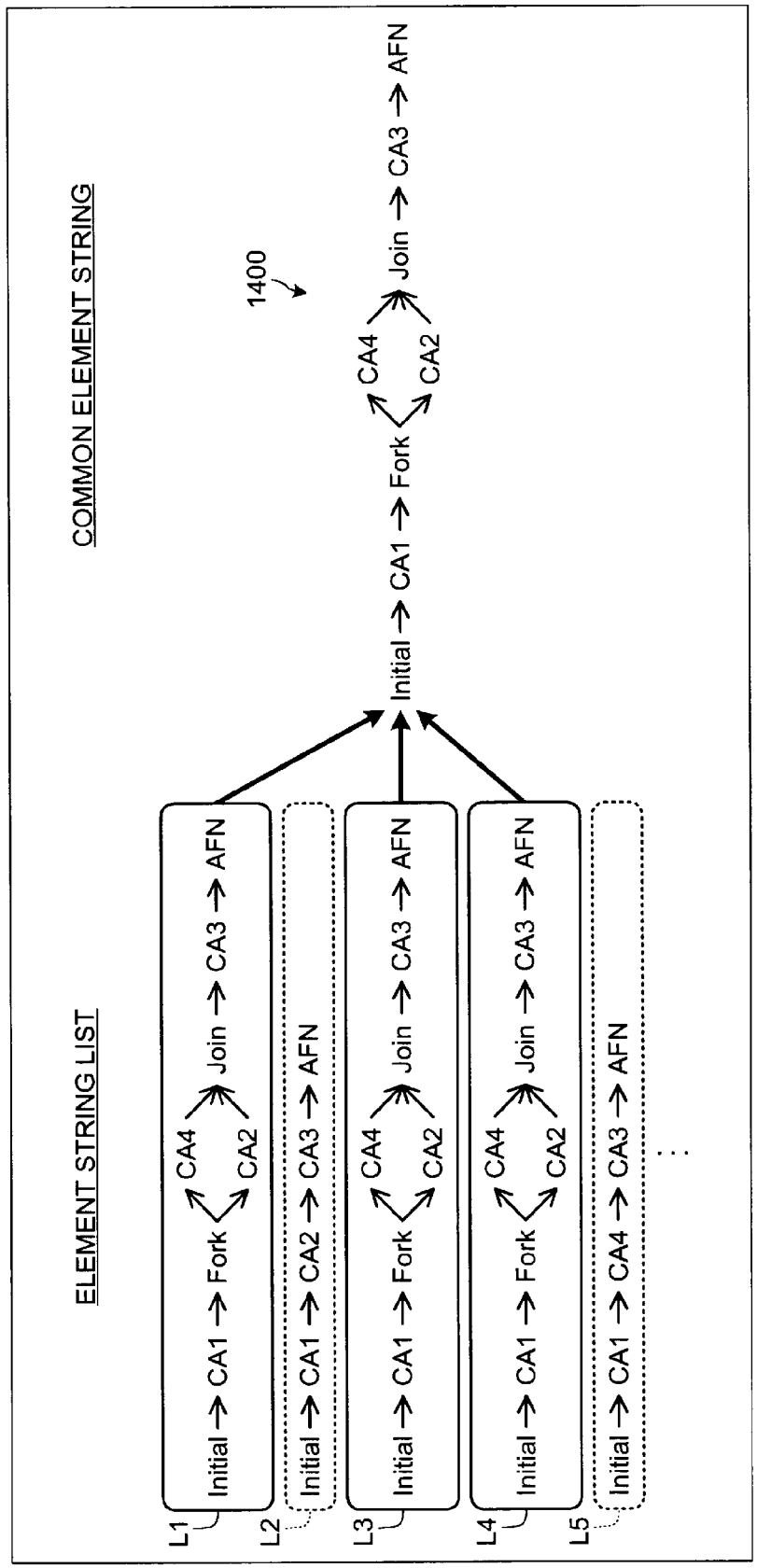
FIG. 14 depicts an example of extraction of a common element string.

FIG. 14 depicts an example of extraction of a common element string. In the example depicted in FIG. 14, the entire element string coincides between 3 strings, element string L1, element string L3, and element string L4 and therefore, a common element string 1400 (an element string of 8 elements) is extracted.

The output unit 709 has a function of outputting the extracted common element string. For example, the output unit 709 outputs as a template for activity diagram generation, the common element string 1400 depicted in FIG. 14. An example of a template will be described hereinafter with reference of FIG. 15.

Further, the output unit 709 may output the element strings (e.g., the element sting list 1300) that are respectively for each activity diagram. Consequently, a generating engineer can extract a common element string by referring to the element string list 1300 and comparing the element strings respectively for each element.

The form of output by the output unit 709 may be, for example, display on the display 508, print out at the printer 513, transmission to an external device via the I/F 509, and storage to a storage area such as the RAM 503, the magnetic disk 505, and the optical disk 507.

Figure 15:
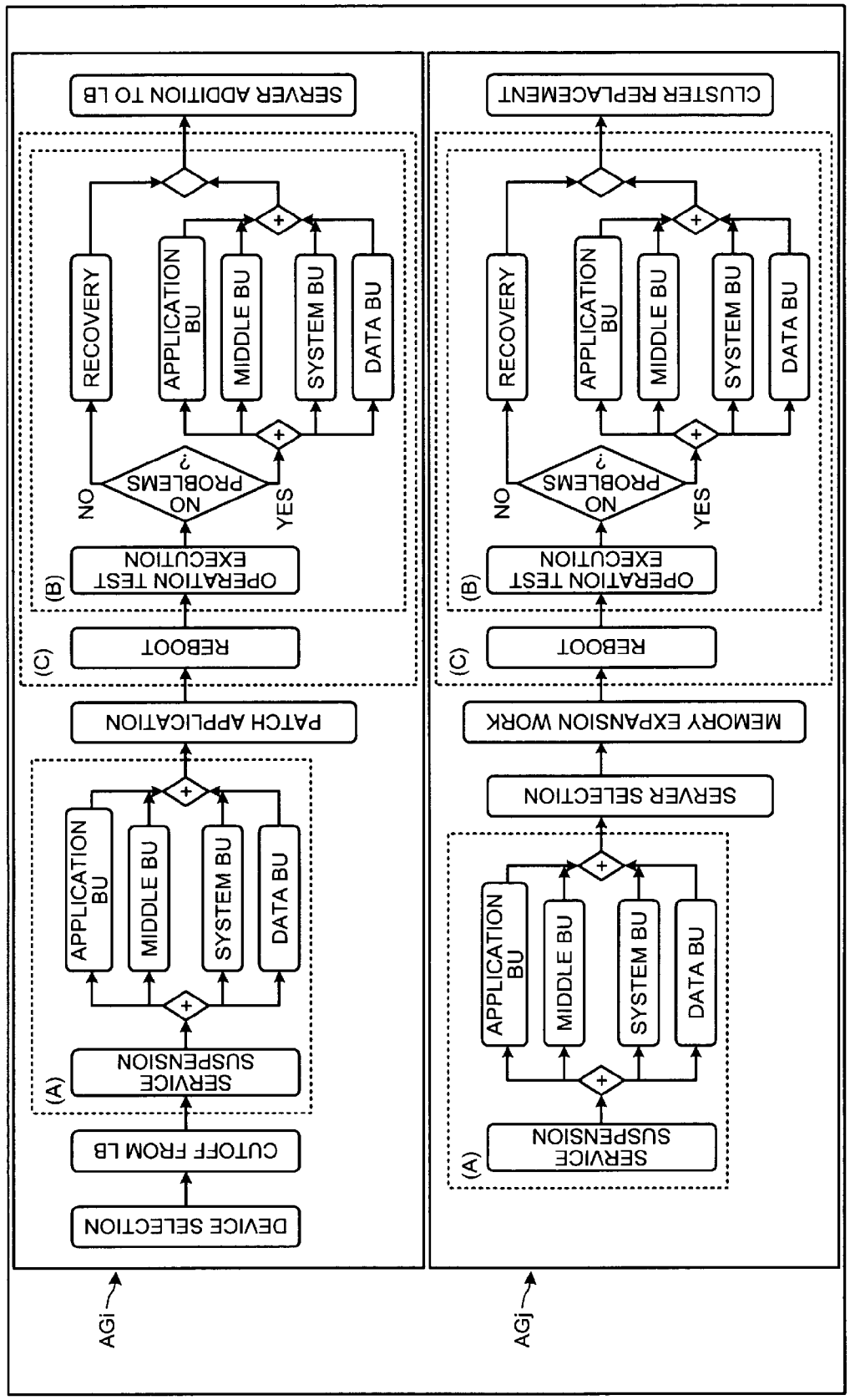
FIG. 15 depicts an example of a template.

An example of a template for activity diagram generation will be described. FIG. 15 depicts an example of a template. In FIG. 15, an activity diagram AGi is an activity diagram expressing the work procedure for patch application work. Further, an activity diagram AGj is an activity diagram expressing the work procedure for increasing memory.

Synonymous elements among the element groups included in the activity diagrams AGi and AGj are assigned a synonymous element name. Consequently, in the example depicted in FIG. 15, as a result of comparing the element strings in the activity diagrams AGi and AGj, templates A to C are extracted. Use of the templates A to C to generate new activity diagrams enables the trouble of generation from scratch to be eliminated, thereby facilitating improved generation efficiency.

Figure 16:
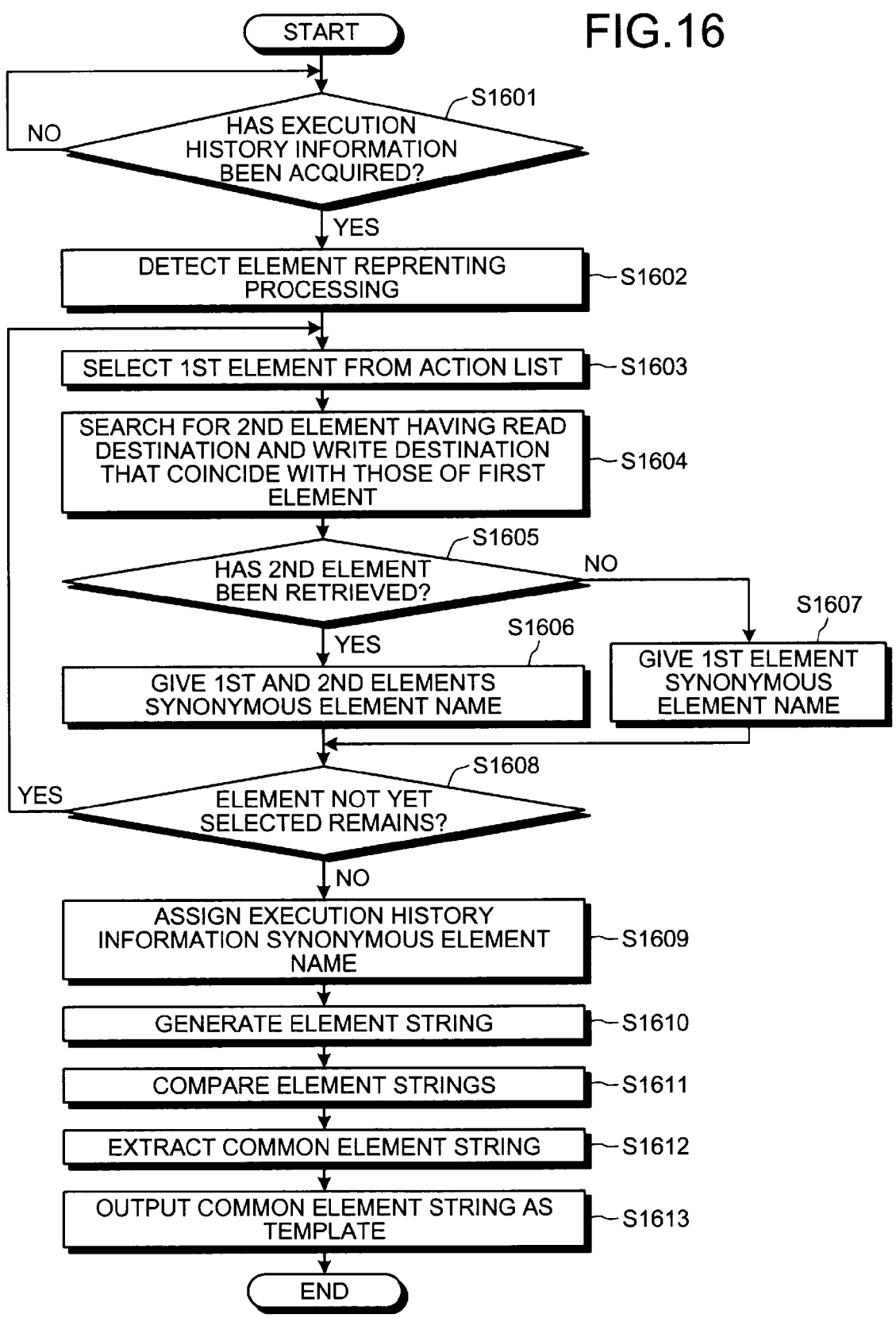
FIG. 16 is a flowchart of and example of operation management support processing by the operation management support apparatus.

Operation management support processing by the operation management support apparatus 500 will be described. FIG. 16 is a flowchart of and example of operation management support processing by the operation management support apparatus. As depicted in FIG. 16, the operation management support apparatus 500 judges whether the execution history data 600-1 to 600-*n* has been acquired by the acquiring unit 701 (step S1601).

The acquisition of the execution history data 600-1 to 600-*n* is awaited (step S1601: NO), upon acquisition (step S1601: YES), the detecting unit 704 refers to the execution history data 600-1 to 600-*n* and detects from among the element groups included in the activity diagrams AG1 to AGn, elements the represent processing (step S1602). The obtained detection results are stored to the action list 800.

The selecting unit 702 selects a first element from the action list 800 (step S1603). The searching unit 703 searches the action list 800 for a second element having a read destination ID and a write destination ID that coincide with those of the first element (step S1604). Here, if multiple elements are present having a read destination ID and a write destination ID that coincide with those of the first element, each of the elements is retrieved as a second element.

The setting unit 705 judges whether a second element has been retrieved (step S1605) and if a second element has been retrieved (step S1605: YES), assigns a synonymous name to the first and the second elements (step S1606). At step S1604, if an element(s) is retrieved as a second element, each is assigned the synonymous element name. On the other hand, if a second element is not retrieved (step S1605: NO), the first element is assigned a synonymous element name (step S1607). The setting results are stored to the classification-completed list 900.

The selecting unit 702 judges whether an unselected element that has yet to be selected from the action list 800 is present (step S1608), if an unselected element is present (step S1608: YES), the flow returns to step S1603.

On the other hand, if no unselected element is present (step S1608: NO), the generating unit 707 refers to the classification-completed list 900, assigns synonymous element names to the elements in the execution history data 600-1 to 600-$n$ (step S1609), and generates an element string for each activity diagram AG1 to AGn listing synonymous element names (step S1610).

The comparing unit 708, using existing pattern matching, compares the element strings respectively for the activity diagrams AG1 to AGn (step S1611). The extracting unit 706, based on the comparison results, extracts common element strings from among the element strings respectively for the activity diagrams AG1 to AGn (step S1612).

The output unit 709 outputs the extracted common element strings as a template(s) for activity diagram generation (step S1613), ending the processing according to the flowchart.

As described, according to the present embodiment, elements accessing the same destinations (CI's) during execution of an activity can be classified as synonymous elements. Consequently, the significance (synonymity) given to elements among different operation processes can be standardized, enabling element string matching between the operation processes. As a result, common element strings between different operation processes can be efficiently and effectively extracted, enabling templates for activity diagram generation to be provided.

Use of the templates to generate activity diagrams for new operation processes eliminates the trouble of generating the activity diagrams from scratch, facilitating improved generation efficiency. Furthermore, use of the templates reduces errors (e.g., missing elements, procedure mistakes) made by an operator with minimal operation management experience, enabling operation process quality to be improved.

Therefore, according to the embodiment, the workload and time consumed for activity diagram generation in operation management of an IT system can be decreased.

The operation management support method described in the present embodiment may be implemented by executing a prepared program on a computer such as a personal computer and a workstation. The program is stored on a non-transitory, computer-readable medium such as a hard disk, a flexible disk, a CD-ROM, an MO, and a DVD, read out from the recording medium, and executed by the computer. The program may be a transmission medium that can be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computer-readable, non-transitory medium storing therein an operation management support program causing a computer to execute a process, the process comprising:
   acquiring and storing into a storage unit, execution history information that indicates for each activity diagram, elements in a given order indicating a series of processing executed based on the activity diagram and indicates, among configuration items stored in a database, a read destination that is read during execution of the elements and a write destination that is written during execution of the elements, wherein the activity diagram expresses work procedures for operation processes executed by a system under operation management, and the database stores configuration items representing attribute information of configuration elements of the system;
   searching among unselected elements that have yet to be selected from among all of the elements, for a second element of which read destination and write destination coincide with those of the first element selected from among all of the elements including elements indicated by the execution history information of each activity diagram, wherein the searching performed by referring to the read destination and the write destination read/written during execution of each element indicated by the execution history information of each activity diagram stored in the storage unit;
   assigning an element name to the first element and the element name same as that of the first element to the second element retrieved at the searching and of which read destination and write destination coincide with those of the first element, wherein the element name is information for uniquely identifying a given element among synonymous elements;
   generating for each activity diagram, element strings listing element names of consecutive elements indicated by the execution history information of the activity diagram, based on a result of the assignment of the element name to each element indicated by the execution history information of the activity diagram at the assigning; and
   outputting the element strings of each activity diagram generated at the generating.

2. The computer-readable, non-transitory medium according claim 1, the process further comprising:
   comparing the element strings of the activity diagrams generated at the generating;
   extracting an element string common to the activity diagrams based on comparison results obtained at the comparing.

3. The computer-readable, non-transitory medium according claim 1, wherein
   the execution history information of each activity diagram indicates the elements representing any one of a start point, an end point, and each processing of a series of processing executed based on the activity diagram, and the assigning includes assigning to the element representing the start point or the end point indicated by the execution history information of each activity diagram, an element name corresponding to an element type of the element.

4. An operation management support method, comprising:

acquiring and storing into a storage unit by a computer, execution history information that indicates for each activity diagram, elements in a given order indicating a series of processing executed based on the activity diagram and indicates, among configuration items stored in a database, a read destination that is read during execution of the elements and a write destination that is written during execution of the elements, wherein the activity diagram expresses work procedures for operation processes executed by a system under operation management, and the database stores configuration items representing attribute information of configuration elements of the system;

searching among unselected elements that have yet to be selected from among all of the elements, for a second element of which read destination and write destination coincide with those of the first element selected from among all of the elements including elements indicated by the execution history information of each activity diagram, wherein the searching performed by referring to the read destination and the write destination read/written during execution of each element indicated by the execution history information of each activity diagram stored in the storage unit;

assigning an element name to the first element and the element name same as that of the first element to the second element retrieved at the searching and of which read destination and write destination coincide with those of the first element, wherein the element name is information for uniquely identifying a given element among synonymous elements;

generating for each activity diagram, element strings listing element names of consecutive elements indicated by the execution history information of the activity diagram, based on a result of the assignment of the element name to each element indicated by the execution history information of the activity diagram at the assigning; and outputting the element strings of each activity diagram generated at the generating.

5. The operation management support method according claim 4, further comprising:

comparing the element strings of the activity diagrams generated at the generating;

extracting an element string common to the activity diagrams based on comparison results obtained at the comparing.

6. The operation management support method according claim 4, wherein the execution history information of each activity diagram indicates the elements representing any one of a start point, an end point, and each processing of a series of processing executed based on the activity diagram, and the assigning includes assigning to the element representing the start point or the end point indicated by the execution history information of each activity diagram, an element name corresponding to an element type of the element.

7. An operation management support apparatus comprising:

a processor configured to execute a process, the process comprising:

acquiring and storing into a storage unit, execution history information that indicates for each activity diagram, elements in a given order indicating a series of processing executed based on the activity diagram and indicates, among configuration items stored in a database, a read destination that is read during execution of the elements and a write destination that is written during execution of the elements, wherein the activity diagram expresses work procedures for operation processes executed by a system under operation management, and the database stores configuration items representing attribute information of configuration elements of the system;

searching among unselected elements that have yet to be selected from among all of the elements, for a second element of which read destination and write destination coincide with those of the first element selected from among all of the elements including elements indicated by the execution history information of each activity diagram, wherein the searching performed by referring to the read destination and the write destination read/written during execution of each element indicated by the execution history information of each activity diagram stored in the storage unit;

assigning an element name to the first element and the element name same as that of the first element to the second element retrieved at the searching and of which read destination and write destination coincide with those of the first element, wherein the element name is information for uniquely identifying a given element among synonymous elements;

generating for each activity diagram, element strings listing element names of consecutive elements indicated by the execution history information of the activity diagram, based on a result of the assignment of the element name to each element indicated by the execution history information of the activity diagram at the assigning; and outputting the element strings of each activity diagram generated at the generating.

8. The operation management support apparatus according claim 7, the process further comprising:

comparing the element strings of the activity diagrams generated at the generating;

extracting an element string common to the activity diagrams based on comparison results obtained at the comparing.

9. The operation management support apparatus according claim 7, wherein the execution history information of each activity diagram indicates the elements representing any one of a start point, an end point, and each processing of a series of processing executed based on the activity diagram, and the assigning includes assigning to the element representing the start point or the end point indicated by the execution history information of each activity diagram, an element name corresponding to an element type of the element.

* * * * *